US012399476B2

(12) United States Patent
Johnson et al.

(10) Patent No.: US 12,399,476 B2
(45) Date of Patent: Aug. 26, 2025

(54) GENERAL PURPOSE COMMAND SYSTEM AND INTERFACE FOR A LIVE BROADCAST

(71) Applicant: PGA TOUR Enterprises, LLC, Ponte Vedra Beach, FL (US)

(72) Inventors: Morgan Johnson, Ponte Vedra Beach, FL (US); Barry Walker, Ponte Vedra Beach, FL (US); Jonathan Fegan, Ponte Vedra Beach, FL (US); Tung Vo, Ponte Vedra Beach, FL (US)

(73) Assignee: PGA TOUR Enterprises, LLC, Ponte Vedra Beach, FL (US)

( * ) Notice: Subject to any disclaimer, the term of this patent is extended or adjusted under 35 U.S.C. 154(b) by 0 days.

(21) Appl. No.: 18/949,736

(22) Filed: Nov. 15, 2024

(65) Prior Publication Data

US 2025/0155862 A1 May 15, 2025

Related U.S. Application Data

(60) Provisional application No. 63/599,489, filed on Nov. 15, 2023.

(51) Int. Cl.
G05B 19/042 (2006.01)
G06F 8/40 (2018.01)

(52) U.S. Cl.
CPC .......... G05B 19/0423 (2013.01); G06F 8/40 (2013.01)

(58) Field of Classification Search
None
See application file for complete search history.

(56) References Cited

U.S. PATENT DOCUMENTS

| 6,069,663 A * | 5/2000 | Bessel ................ H04N 21/4113 348/441 |
| 6,345,364 B1 * | 2/2002 | Lee ........................ G06F 1/3265 713/324 |
| 6,438,618 B1 * | 8/2002 | Lortz ...................... G06F 9/542 719/318 |
| 7,024,677 B1 * | 4/2006 | Snyder ................. G11B 27/031 725/86 |
| 8,539,080 B1 * | 9/2013 | Uluderya .............. G06F 9/5027 709/225 |
| 9,067,132 B1 * | 6/2015 | Bergeron ................ G06F 3/016 |
| 11,457,049 B2 * | 9/2022 | Kolbert-Hyle ........ H04L 65/611 |

(Continued)

OTHER PUBLICATIONS

International Search Report issued Jan. 17, 2025 in connection with PCT Application No. PCT/US2024/056268.

(Continued)

*Primary Examiner* — Adam Lee
(74) *Attorney, Agent, or Firm* — Akerman LLP

(57) ABSTRACT

A GPI device includes a communication port for receiving a GPI signal from a first device, one or more processors; and a memory comprising program instructions. The program instructions, when executed by the one or more processors, cause the GPI device to assign a command to the GPI signal when the GPI device receives the GPI signal from the first device and transmit the command to a second device. The transmission of the command may be triggered by the received GPI signal. The command may include a script, such as a python script. The command may also include triggering transmission of a live broadcast, switching between graphics during the live broadcast, or a combination thereof.

20 Claims, 2 Drawing Sheets

(56) References Cited

U.S. PATENT DOCUMENTS

| | | | |
|---|---|---|---|
| 11,607,601 B1 | 3/2023 | Lovell et al. | |
| 11,745,084 B1 | 9/2023 | Lovell et al. | |
| 11,872,464 B1 | 1/2024 | Vitti et al. | |
| 11,986,699 B1 | 5/2024 | Walker et al. | |
| 11,998,829 B2 | 6/2024 | Lovell et al. | |
| 12,161,913 B2 | 12/2024 | Walker et al. | |
| 12,179,085 B2 | 12/2024 | Vitti et al. | |
| 2001/0047394 A1* | 11/2001 | Kloba | G06F 16/9574 709/217 |
| 2002/0109710 A1* | 8/2002 | Holtz | G11B 27/034 |
| 2003/0023971 A1* | 1/2003 | Martinolich | H04N 21/235 725/32 |
| 2003/0046709 A1* | 3/2003 | Kuo-Wen | H04N 21/4782 348/E7.071 |
| 2004/0073912 A1* | 4/2004 | Meza | G06F 16/258 719/321 |
| 2005/0210419 A1* | 9/2005 | Kela | G06F 3/0484 382/103 |
| 2005/0278618 A1* | 12/2005 | Ogikubo | G11B 27/034 725/135 |
| 2005/0281204 A1* | 12/2005 | Karol | H04L 43/50 370/252 |
| 2008/0091856 A1* | 4/2008 | Blaisdell | H04L 41/0809 710/63 |
| 2010/0103324 A1* | 4/2010 | Maegawa | H04N 5/268 348/E5.057 |
| 2010/0115147 A1* | 5/2010 | Kim | G06F 13/10 710/14 |
| 2010/0142447 A1* | 6/2010 | Schlicht | H04W 4/20 370/328 |
| 2010/0285771 A1* | 11/2010 | Peabody | G08B 25/001 379/38 |
| 2011/0132987 A1* | 6/2011 | Hoeksel | H04L 63/0853 235/492 |
| 2013/0024584 A1* | 1/2013 | Marcus | G06F 21/00 710/63 |
| 2013/0054603 A1* | 2/2013 | Birdwell | G06F 16/2465 707/738 |
| 2013/0176216 A1* | 7/2013 | Ichieda | H04N 9/312 345/157 |
| 2014/0082117 A1* | 3/2014 | Unhale | H04L 67/306 709/208 |
| 2014/0259147 A1* | 9/2014 | L'Heureux | H04L 63/02 726/14 |
| 2014/0267195 A1* | 9/2014 | Enns | G06F 3/0334 345/184 |
| 2015/0003539 A1* | 1/2015 | Umezaki | H04N 19/42 375/240.28 |
| 2015/0085131 A1* | 3/2015 | Anderson | H04N 23/62 348/157 |
| 2015/0326446 A1* | 11/2015 | Koverman | H04L 41/0627 709/224 |
| 2015/0382208 A1 | 12/2015 | Elliott et al. | |
| 2016/0239819 A1* | 8/2016 | Yamada | G06Q 20/209 |
| 2016/0371099 A1* | 12/2016 | Woog | H04L 69/28 |
| 2017/0031689 A1* | 2/2017 | Wokhlu | G06F 9/3004 |
| 2017/0060541 A1* | 3/2017 | Saleh | G06F 8/34 |
| 2017/0115689 A1* | 4/2017 | Liu | G06F 1/1605 |
| 2017/0300369 A1* | 10/2017 | Cheung | G06F 16/27 |
| 2018/0013583 A1* | 1/2018 | Rubenstein | H04L 61/4511 |
| 2018/0034889 A1* | 2/2018 | Rubenstein | H04N 21/6125 |
| 2018/0091417 A1* | 3/2018 | Oré | H04L 45/302 |
| 2018/0189853 A1* | 7/2018 | Stewart | B01F 33/848 |
| 2018/0232323 A1* | 8/2018 | Ghosh | G06F 13/4291 |
| 2018/0254648 A1* | 9/2018 | Harju | H02J 7/00 |
| 2018/0270161 A1* | 9/2018 | Popescu | H04L 43/0864 |
| 2019/0129492 A1* | 5/2019 | Chen | G06F 1/266 |
| 2019/0244425 A1 | 8/2019 | Koohmarey | |
| 2020/0080741 A1* | 3/2020 | Lau | F24F 11/64 |
| 2020/0099735 A1* | 3/2020 | Mashaal | G06F 15/76 |
| 2020/0112167 A1* | 4/2020 | Jang | H02H 1/0007 |
| 2020/0112363 A1* | 4/2020 | Roy | H04W 40/12 |
| 2020/0117564 A1* | 4/2020 | Wu | G06F 11/2635 |
| 2020/0293549 A1* | 9/2020 | Wang | H04L 67/1095 |
| 2020/0409444 A1* | 12/2020 | Delshadpour | H04L 25/0298 |
| 2021/0216213 A1* | 7/2021 | Shveidel | H04L 67/1001 |
| 2021/0283498 A1* | 9/2021 | Zhang | G06F 9/547 |
| 2021/0339132 A1* | 11/2021 | Shakespeare | A63F 13/537 |
| 2021/0360295 A1* | 11/2021 | Sze | G11B 27/34 |
| 2021/0393122 A1* | 12/2021 | Milea | A61B 3/04 |
| 2021/0406079 A1* | 12/2021 | Atur | G06F 9/4881 |
| 2022/0165027 A1* | 5/2022 | Lee | G06V 10/803 |
| 2022/0189478 A1* | 6/2022 | Boo | G10L 17/22 |
| 2022/0393966 A1* | 12/2022 | Eriksson | H04L 45/24 |
| 2023/0238020 A1* | 7/2023 | Yae | G10L 25/84 |
| 2023/0334334 A1 | 10/2023 | Wang et al. | |
| 2024/0071220 A1* | 2/2024 | Perumalla | B60W 60/0015 |
| 2024/0316436 A1 | 9/2024 | Lovell et al. | |
| 2024/0325859 A1 | 10/2024 | Lovell et al. | |
| 2024/0362071 A1* | 10/2024 | Roque | G06F 9/5072 |
| 2024/0385767 A1* | 11/2024 | Desai | G06F 12/0246 |
| 2025/0099808 A1 | 3/2025 | Walker et al. | |

OTHER PUBLICATIONS

Written Opinion of the International Searching Authority issued Jan. 17, 2025 in connection with PCT Application No. PCT/US2024/056268.

U.S. Appl. No. 18/987,874, filed Dec. 19, 2024 entitled Pan and Tilt Head.

U.S. Appl. No. 19/044,610, filed Feb. 3, 2025 entitled Event Data Immersion System.

U.S. Appl. No. 19/087,160, filed Mar. 21, 2025 entitled Golf Cart Tow Link.

U.S. Appl. No. 18/999,995, filed Dec. 23, 2024 entitled Golf Tournament Management System.

U.S. Appl. No. 18/963,118, filed Nov. 27, 2024 entitled Golf Play Outcome Simulation Modeling System.

U.S. Appl. No. 18/813,325, filed Aug. 23, 2024 entitled Golf Event Broadcast Production System.

U.S. Appl. No. 18/510,522, filed Nov. 15, 2023 entitled Hybrid Power Systems and Methods.

U.S. Appl. No. 18/949,970, filed Nov. 15, 2024 entitled Golf Tracking System for Monitoring and Management of Data.

U.S. Appl. No. 18/785,659, filed Jul. 26, 2024 entitled Platform to Manipulate Golf Data to Enable Creation of Broadcast Production Graphics.

U.S. Appl. No. 19/170,473, filed Apr. 4, 2025 entitled Management of Golf Tournament Scoring Data.

* cited by examiner

GENERAL PURPOSE COMMAND SYSTEM AND INTERFACE FOR A LIVE BROADCAST

CROSS REFERENCE TO RELATED APPLICATIONS

The present application claims the benefit of the priority data of U.S. Provisional Patent Application No. 63/599,489, filed Nov. 15, 2023, the contents of which are hereby incorporated herein by reference.

TECHNOLOGY

The present disclosure is directed to GPI command systems including a GPI device and methods of generating commands from GPI signals to control non-GPI compatible devices.

BACKGROUND

A general purpose interface (GPI) is a signaling protocol used by a first device to control a second device. GPI generally speaking, GPI employs high/low voltage signaling and has historically enjoyed broad application. However, rapid technological advancements and diversification in both hardware and software have created complex interface compatibility issues that have rendered GPI signaling protocols unsuitable for use between many devices. What is needed are solutions to bridge the compatibility gap and increase the application of GPI to devices and software that are currently incompatible.

SUMMARY

In one aspect, a GPI device includes a communication port for receiving a GPI signal from a first device, one or more processors; and a memory comprising program instructions. The program instructions, when executed by the one or more processors, cause the GPI device to assign a command to the GPI signal when the GPI device receives the GPI signal from the first device and transmit the command to a second device. The transmission of the command is triggered by the received GPI signal. In one example, the command includes a python script.

In one example, the GPI device may include a single board computer compatible with the python script. The GPI device may be further configured to convert the GPI signal to the python script.

In any combination of the above examples or another example, the command may include a signal to open or close a circuit or switch, power on, power off, trigger an actuator, modify power supply to control a motor, or a combination thereof.

In any combination of the above examples or another example, the command may include instructions for the second device to further modify the command.

In any combination of the above examples or another example, the command may include triggering transmission of a live broadcast, switching between graphics during the live broadcast, or a combination thereof. The GPI device may be further configured to utilize smart routing to transmit the GPI signal. Smart routing further comprises optimizing latency for instantaneous transmission and delivery of the command to the second device when the first device triggers transmission of the GPI signal that triggers the transmission of the command to the second device. The command or the script may further include routing data that specifies where the python script is to be transmitted when utilizing smart routing.

In one example, the first device comprises a broadcast switcher, the second device comprises a graphics engine. In a further example, the broadcast switcher and the command instruct the graphics engine to generate a graphic. In another example, the second device comprises a video server and the command instructs the video server to play a video.

In one aspect, a method of controlling multiple devices using a GPI device includes receiving, by a communication port, a GPI signal from a first device; assigning, using one or more processors, a command to the GPI signal; and transmitting, using the one or more processors, the command to a second device. Transmitting the command may be triggered by receiving the GPI signal. In one example, the command comprises python script.

In one example, the GPI device further includes a single board computer compatible with python script. In this aspect, method further includes converting the GPI signal to the python script.

In the above or another example, the command may include a signal to open or close a circuit or switch, power on, power off, trigger an actuator, modify power supply to control a motor, or a combination thereof. The command may also instruct the second device to further modify the command.

In any combination of the above examples or another example, the command includes triggering transmission of a live broadcast, switching between graphics during the live broadcast, or a combination thereof. The method may further include utilizing smart routing to transmit the command. In this aspect, smart routing further comprises optimizing latency for instantaneous transmission and delivery of the command to the second device when the first device triggers transmission of the GPI signal that triggers the transmission of the command to the second device. The command or the script further include routing data that specifies where the python script is to be transmitted.

In one example of the method, the first device is a broadcast switcher, the second device is a graphics engine and the method further includes instructing the graphics engine to generate a graphic. In another example of the method, the second device is a video server and the method further includes instructing the video server to play a video.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DESCRIPTION

Figure 1:
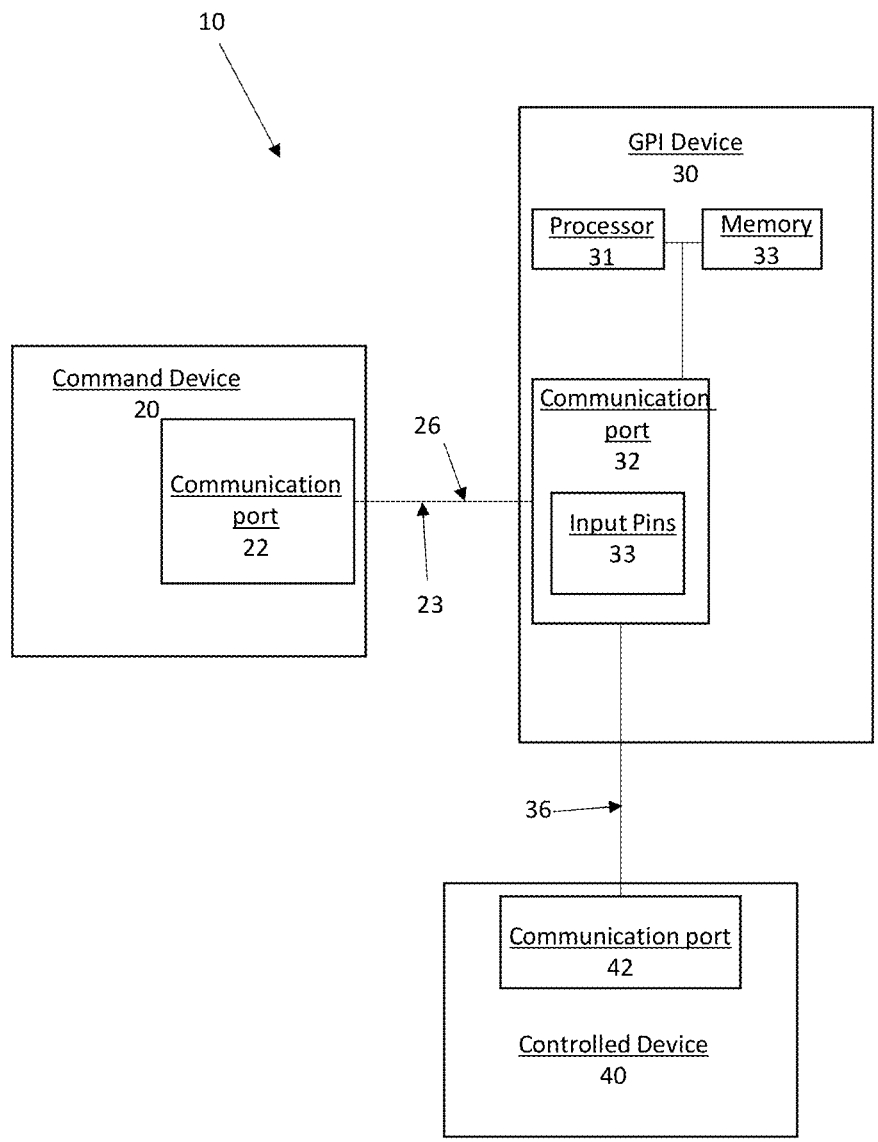
FIG. 1 schematically illustrates a GPI command system 10 including a GPI device according to various embodiments herein.
Figure 2:
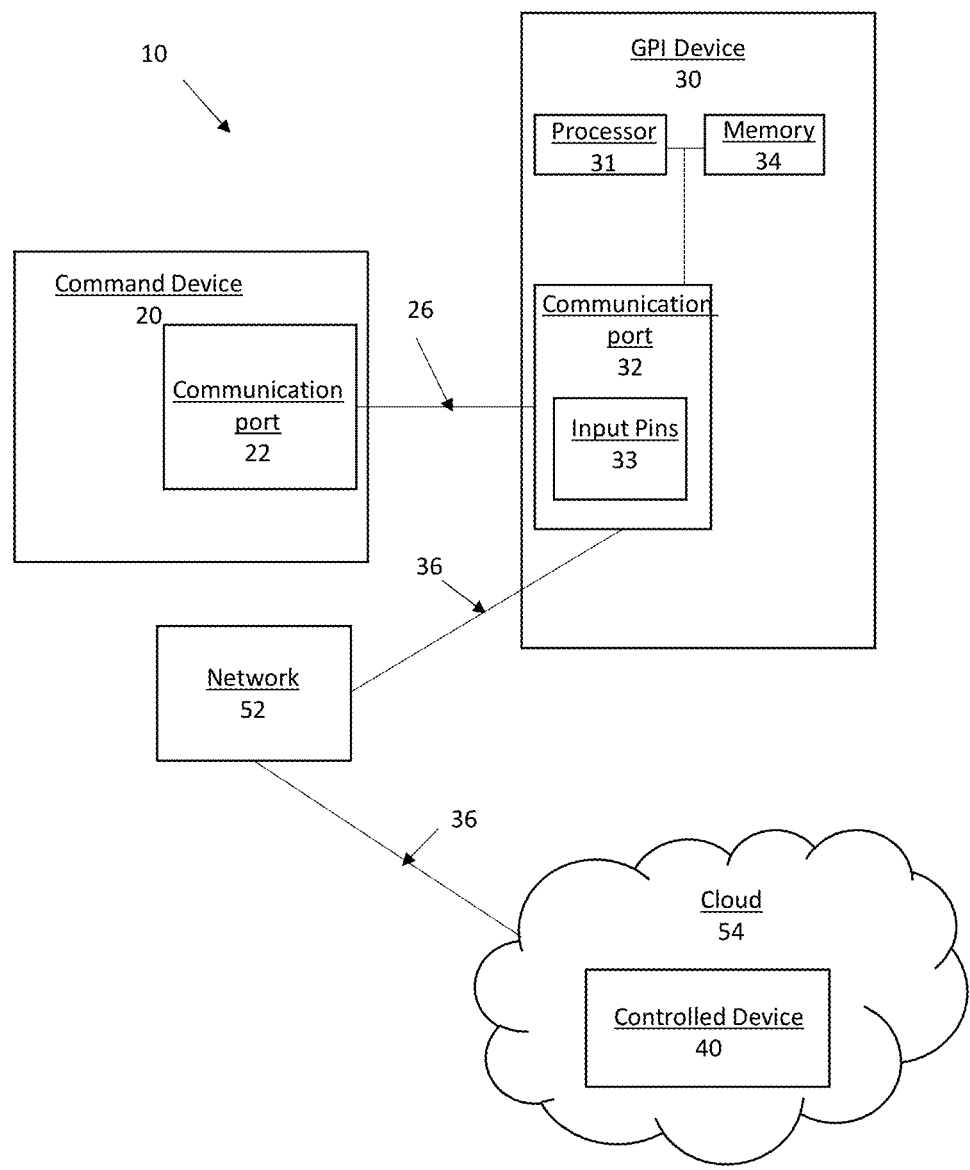
FIG. 2 schematically illustrates a GPI command system 10 including a GPI device according to various embodiments herein.

Various embodiments of a GPI command system including a GPI device and methods of generating commands from GPI signals are described herein. FIGS. 1-2 illustrate various embodiments of a GPI command system 10 including a GPI device 30, wherein like numbers indicate like features.

The GPI device 30 may be configured to receive GPI signals 26 from a first device, which may also be referred to herein as a command device 20, and use the GPI signals 26 to trigger a command 36 that is ultimately used to control another device, which may also be referred to herein as a controlled device 40. The GPI device 30 may comprise an electronic device operable to receive GPI signals 26 and cause a command 36 assigned to the GPI signal 26 to be triggered. The GPI device 30 may be further configured to output the command 36 in a language compatible with the controlled device 40 to cause the controlled device 40 to execute all or a portion of the command 36. In various embodiments, the GPI device 30 is or comprises a computer, micro controller, board-level controller, expansion card, or single board computer.

The GPI device 30 may comprise or operatively integrate with a computer comprising a processor 31 and memory 34 storing instructions that when executed by the processor 31 perform the operations of the GPI device 30. In various embodiments, operations of the GPI device 30 may include communications within, between, or among networks or networked devices. For example, one or more of the command device 20, GPI device 30, or controlled device 40 may reside on one or more networks (e.g., WLAN, LAN, WAN, internet, or Cloud). The command device 20, GPI device 30, or controlled device 40 may be within the same or different networks. In an above or another example, the command device 20, GPI device, controlled device or combination thereof may utilize a VPN to securely transmit respective GPI signals 26 or commands 36. In some embodiments, one or more of the command device 20, GPI device 30, or controlled device 40 is not associated with a network.

In some embodiments, the memory 30 may be tangible, non-transitory computer-readable media including program instructions. The program instructions, when executed by processor 31, cause the GPI device 30 to perform operations when the GPI device 30 receives the GPI signal 26 from the command device 20. The operations may include assigning the command 36 to the GPI signal 26 and transmitting the command 36 to the controlled device 40.

The GPI device 30 may include a communication port 32 configured to receive the GPI signals 26 from the command device 20 directly, indirectly, over one or more wired or wireless networks, or combination thereof via wired or wireless data protocols. The communication port 32 may also be configured to transmit the command 36 triggered by the GPI signals 26 directly, indirectly through one or more intermediate devices, over one or more wired or wireless networks, or combination thereof via wired or wireless data protocols. As described in more detail below, the GPI device 30 may include input pins 33, e.g., general purpose input pins, configured to receive the GPI signals. In this way, a receiver portion of the communication port 32 may include input pins 33. Input pins 33 may be physical pins, analogs defined in hardware or software, or both.

The command device 20 may be any electronic device configured to generate GPI level signals. The command device 20 may be an electronic device such as a computer, remote clicker or other transmitter, a broadcast switcher, or the like. The command device 20 may include a communication port comprising a transmitter configured for wired or wireless communication. For example, GPI signals 26 may be transmitted by the command device 20 via I/O, IP, TCP, TCP/IP, RF, short range RF (e.g, UWB, WiFi, Bluetooth protocol), or cellular.

The command device 20 may include a communication port 22 configured to transmit GPI signals 26 via wired or wireless protocols. The GPI signals 26 may be transmitted directly to a suitable communication port 32 of the GPI device 30 or may be transmitted indirectly through one or more wired or wireless networks or intermediate devices. For example, the command device 20 may transmit GPI signals 26 along one or more wires connecting the command device 20 to the GPI device 30. In one configuration, one or more wires are connected to one or more input pins 33 of the GPI device 30. In another configuration, the GPI signals 26 are transmitted via wired or wireless protocol to the communication port 32 of the GPI device 30 and the GPI signals 26 are provided to a detection circuit. The GPI device 30 may be programmed to interpret the received GPI signals 26 as GPI input signals for purposes of triggering the programmed command 36 corresponding to the GPI signal 26. In another example, the GPI device 30 includes a relay that is coupled to input pins 33 to relay the GPI signals 26 to the input pins 33. In one embodiment, the command device 20 transmits GPI signals 26 wirelessly to a network from the communication port 22 that transmits the GPI signals 26 to the GPI device 30 via wired or wireless protocols. The GPI device 30 may be on the same or different network. In one configuration, the command device 20 may wirelessly transmit the GPI signal 26 directly or indirectly to a relay connected to input pins of the GPI device 30 to relay the GPI signal 26 at the pins. In one example, the GPI device 30 includes the relay and the wirelessly transmitted GPI signal 26 is received by the communication port via a wired or wireless connection. In one example, pins of the GPI device 30 may be configured is software for control remotely based on the GPI signals 26.

The controlled device 40 may be any electronic device capable of being controlled by a command 36. For example, the command 36 may be received by the controlled device 40 as a signal to open or close a circuit or switch, power on, power off, trigger an actuator, modify power supply to control a motor, or any other commendable action. The command 36 may be executed in hardware or software. For example, the controlled device 40 may include a processor configured to execute the command 36. The controlled device 40 may also include memory storing instructions that when executed by the processor cause the processor to perform the operations of the controlled device 40, which may include executing the command 36. For instance, the instructions may include a program wherein the command is in the same or a compatible language with the program such that the command 36 may be executed by the controlled device 40. In one example, the controlled device 40 comprises a graphics engine and the command 36 instructs the graphics engine to generate a graphic. In another example, the controlled device 40 comprises a video server and the command 36 instructs the video server to play a video. The instruction or result of execution of the command 36 is not limited. For instance, the command 36 may instruct the controlled device 40 to further modify the command 36 or other data, transmit the command 36 or other data, take an action, or perform some other task in hardware or software. The command device 20 may include a communication port 42 configured for wired or wireless communication. For example, commands 36 may be transmitted by the controlled device 40 via I/O, IP, TCP, TCP/IP, RF, short range RF (e.g., UWB, WiFi, Bluetooth protocol), or cellular.

In operation, a GPI signal 26 may be received at input pins 33, e.g., general purpose input pins, or otherwise by the GPI device 30 such that the GPI device 30 detects the signal and causes the assigned command 36 to be triggered. In some embodiments, the GPI device 30 includes general purpose input/output (GPIO) pins. The state of one or more of the pins may be defined as input in hardware or software.

As introduced above, the GPI device 30 may be operable to receive GPI level signals at input pins 33 or otherwise and, based on the GPI signals 26, output commands 36 assigned to the GPI signal 26 in a language compatible with the controlled device 40. For example, a GPI device 30, such as a Raspberry Pi single board computer, compatible with python may include GPIO pins programmed to detect GPI level signals that specify trigger events having associated python scripts that are transmitted to the controlled device 40 compatible with python language commands 36 upon detection of the assigned GPI signal 26. Thus, the GPI signals 26 may be used to trigger GPI defined commands 36 in the form of python scripts.

Further to the above, the GPI device 30 may be programmed to convert GPI level signals to python script. The GPI level signals may be used to trigger events that run a defined function. The function may include a python script. In one example, the GPI signal 26 may trigger a callback function programmed to execute an assigned command 36 comprising transmitting the python script wherein the command 36 and python script are specified by the GPI signal 26 value. In one embodiment, the function, e.g., the command 36 or python script, may include routing data that specifies where the script is to be transmitted. In another embodiment, all scripts are transmitted to the same hardware or software destination, e.g., address. Routing may be through wired or wireless communication over one or more networks (e.g., WLAN, LAN, WAN, same or different network as the GPI device 30, command device, or both, Cloud) using suitable communication protocols (e.g., TCP/IP, POP, HTTP, SMTP, WIRE, OSI).

As described above, the GPI device 30 may be configured to operate in a wide variety of GPI command system 10 variations.

In FIG. 1, the command device 20 and GPI device 30 are connected by one or more wires 23 suitable for conducting the GPI signal 26, e.g., copper wire. The one or more wires 23 are coupled between the communication port 22 of the command device 20, comprising a transmitter, and a receiver portion of the communication port 32 of the GPI device 30, comprising input pins 33, configured to receive the GPI signal 26. The GPI device 30 is programmed to detect the GPI signal 26 and trigger a programmed command 36 determined from the GPI signal 26 received. The command 36 comprises a script in a language compatible with the controlled device 40. The GPI device 30 is configured to transmit the command 36 via a wired or wireless protocol to the command device for execution of script. For example, the communication ports 32, 42 may be in digital communication via one or more network cables. As another example, communication port 32 may transmit a RF signal including the command 36 that the controlled device 40 executes when received by communication port 42.

FIG. 2 illustrates a GPI command network 11 wherein the GPI signal 26 is used to trigger a command 36 to a cloud computing environment. The command device 20 and GPI device 30 may be connected by one or more wires 23 suitable for conducting the GPI signal 26, e.g., copper wire, as described with respect to FIG. 1 or the GPI signal 26 may be transmitted to the GPI device 30 by wireless protocol. The GPI device 30 is programmed to detect the GPI signal 26 and trigger a programmed command 36 determined from the GPI signal 26 received. The command 36 comprises a script in a language compatible with the controlled device 40. The GPI device 30 is in wired or wireless data communication with a network 52 that transmits the command 36 to the cloud 54 for execution of the command 36 to control the controlled device 40. The connection with the network 52 may utilize TCP/IP connection protocol to pass the command 36, e.g., message.

In one embodiment, a method of triggering a command 36 from a command device 20 using GPI signals 26 to control a controlled device 40 includes receiving the GPI signals 26 at a GPI device 30 as described herein and using the GPI signals 26 to trigger the command 36 wherein the command 36 comprises a script programmed to be triggered by the GPI signals 26 and transmitting the command 36 to the control device 40. The method may utilize hardware, software, or data communication protocols as described in FIGS. 1-2 or elsewhere herein.

In one example, the command device 20 comprises a production switcher, such as a broadcast switcher, and the controlled device 40 comprises a graphics engine. The GPI device 30 may provide a physical interface for a cloud-based broadcasting network trigger. For example, the GPI device 30 may be utilized to trigger commands to a cloud broadcast service rather than a local set of broadcasting tools. The GPI device 30 may be employed as the last step in a hardware control chain between a video switcher command device 20 and the devices it communicates with via GPI before entering the cloud. The GPI device 30 may catch the broadcast style GPI signal 26 and convert it into a script, such as Python script, that can be transmitted anywhere, such as a laptop sitting on the same LAN as the GPI device 30 or machine running on a cloud service, such as Amazon EC2, instance also accessible via the internet. In one such example, the GPI device 30 comprises a Raspberry Pi computer that connects to the video switcher command device 20 via low level electric contact closures on copper wires connected between the devices.

In various embodiments, the GPI device is provided as a broadcast or graphics switching service for live broadcast, sports, or gambling. Accordingly, a method of broadcast or graphics switching for live broadcasts, sports, or gambling may include transmitting a GPI signal to the GPI device.

In one embodiment, the GPI device, which may include a GPI service, may be used for triggering any mission critical function either in remote hardware or software that requires extreme latency. For example, the GPI device may include, be configured with, or be configured to transmit triggered commands via smart routing that optimizes latency for command data delivery for near instantaneous delivery of commands to a controlled device upon the command device triggering transmission of the GPI signal that triggers the transmission of the command to the controlled device. Smart routing may comprise core enhancements that ensure latency is sufficiently reduced to allow for use in a live broadcast, sports, gambling or other setting where trigger speed is imperative. In one example, smart routing may include employing continuously updated mapping of optimal data paths to network services to optimize latency for data delivery and triggering. In a further example, the updated mapping may be continually optimized in the cloud layer, at the trigger level, or in other locations or using different methods along the routing path. In a further example, this smart routing may be configured to utilize continuously provided network intelligence or previously defined optimal or reserved pathing. In various embodiments, the GPI device may be configured to utilize smart routing such that a user of a command device may push a button, flip a switch, or otherwise initiate transmission of a GPI signal and the triggered command nearly instantaneously is received by the controlled device to cause the desired action or result.

In various embodiments, the GPI device may operate as a service that is administered through scripts stored in a cloud or other computing service that allows a service client computer to self-register. For example, a service client may register with the service and create or select desired scripting options. In a further example, the scripting options may be created or selected for use across multiple types of output trigger devices. Additionally or alternatively, a service client may register for use of existing scripting services. Thus, the service may be customizable by the service client such that GPI signals triggered by different command devices may be received to trigger desired commands, which may be the same command from a same GPI signal received from different command devices, different commands from the same GPI signal received from different command devices, the same commands from different GPI signals received from different command devices, different commands from different GPI signals received from the same command device, or different commands from different GPI signals received from different command devices. In one embodiment, the ability to push or send a command from one graphics device to another graphics device, which may be a physical graphics device or cloud-based, using the GPI device, or service thereof, is based on when a button or other defined start mechanism for the service is triggered for the relationship between the GPI service and the connected graphic devices.

At least a portion of the systems, GPI device, methodologies, and techniques described with respect to the exemplary embodiments may incorporate a machine, such as, but not limited to a computer system or other computing device within which a set of instructions, when executed, may cause the machine to perform any one or more of the methodologies or functions discussed above. The machine may be configured to facilitate various operations conducted by the systems. For example, the machine may be configured to, but is not limited to, assist the systems by providing processing power to assist with processing loads experienced in the systems, by providing storage capacity for storing instructions or data traversing the systems, or by assisting with any other operations conducted by or within the systems. In some embodiments, the machine may operate as a standalone device. In some embodiments, the machine may be connected (e.g., using communications network, another network, or a combination thereof) to and assist with operations performed by other machines and systems, such as, but not limited to, the command device, GPI device, controlled device, network, databases, any other system, program, and/or device, or any combination thereof. The machine may be connected with any component in the systems. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system may include a processor (e.g., a central processing unit (CPU), a graphics processing unit (GPU), or both), a main memory and a static memory, which communicate with each other via a bus. The computer system may further include a video display unit, which may be, but is not limited to, a liquid crystal display (LCD), a flat panel, a solid state display, or a cathode ray tube (CRT). The computer system may include an input device, such as, but not limited to, a keyboard, a cursor control device, such as, but not limited to, a mouse, a disk drive unit, a signal generation device, such as, but not limited to, a speaker or remote control, and a network interface device. The disk drive unit may include a machine-readable medium on which is stored one or more sets of instructions, such as, but not limited to, software embodying any one or more of the methodologies or functions described herein, including those methods illustrated above. The instructions may also reside, completely or at least partially, within the main memory, the static memory, or within the processor, or a combination thereof, during execution thereof by the computer system. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, certain methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium containing instructions so that a device connected to the communications network, another network, or a combination thereof, can send or receive voice, video or data, and communicate over the communications network, another network, or a combination thereof, using the instructions. The instructions may further be transmitted or received over the communications network, another network, or a combination thereof, via the network interface device. The term "machine-readable medium" should be taken to include a single medium or multiple media (e.g., a centralized or distributed database, and/or associated caches and servers) that store one or more sets of instructions. The term "machine-readable medium" shall also be taken to include any medium that is capable of storing, encoding or carrying a set of instructions for execution by the machine and that causes the machine to perform any one or more of the methodologies of the present disclosure. The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A general purpose interface (GPI) device comprising:
    a communication port configured to receive a general purpose signal from a first device and transmit a command to a second device;
    a general purpose interface including general purpose input pins for detecting general purpose signals;
    one or more processors including a single board computer compatible with the command; and
    a memory comprising program instructions, wherein the program instructions, when executed by the one or more processors, configure the GPI device to:
        detect, at the general purpose interface, the general purpose signal transmitted by the first device;
        based on the detection:
            trigger the GPI device to convert the general purpose signal to the command assigned to the general purpose signal; and
            trigger a callback function to transmit the command to the second device via the communication port, wherein the command comprises a script in a language compatible with the second device, and wherein the second device executes the command.

2. The GPI device of claim 1, wherein the script is python script.

3. The GPI device of claim 1, wherein the command includes a signal for the second device to open or close a circuit or switch, power on, power off, trigger an actuator, modify power supply to control a motor, or a combination thereof.

4. The GPI device of claim 1, wherein the command instructs the second device to further modify the command.

5. The GPI device of claim 1, wherein the command triggers the second device to transmit a live broadcast, switch between graphics during the live broadcast, or a combination thereof.

6. The GPI device of claim 5, wherein the GPI device is further configured to utilize smart routing to transmit the general purpose signal and/or the command.

7. The GPI device of claim 6, wherein the callback function further includes routing data that specifies where the script is to be transmitted.

8. The GPI device of claim 6, wherein the smart routing comprises optimizing latency for near instantaneous transmission and delivery of the command to the second device when the detection triggers the callback function to transmit the command to the second device.

9. The GPI device of claim 1, wherein the first device is a broadcast switcher, wherein the second device is a graphics engine, and wherein the command instructs the graphics engine to generate a graphic.

10. The GPI device of claim 1, wherein the second device is a video server, and wherein the command instructs the video server to play a video.

11. A method comprising:
    receiving, at a communication port of a general purpose interface (GPI) device, a general purpose signal from a first device;
    detecting, at a general purpose interface including general purpose input pins of the GPI device, the general purpose signal transmitted to the GPI device by the first device;
    based on the detecting:
        triggering the GPI device to convert, using one or more processors of the GPI device, the general purpose signal to a command assigned to the general purpose signal; and
        triggering a callback function to transmit, using the communication port, the command to the second device, wherein:
            the one or more processors include a single board computer compatible with the command,
            the command comprises a script in a language compatible with the second device, and
            the second device executes the command.

12. The method of claim 11, wherein the script comprises a python script.

13. The method of claim 11, wherein the command includes a signal for the second device to open or close a circuit or switch, power on, power off, trigger an actuator, modify power supply to control a motor, or a combination thereof.

14. The method of claim 11, wherein the command instructs the second device to further modify the command.

15. The method of claim 11, wherein the command triggers the second device to transmit a live broadcast, switch between graphics during the live broadcast, or a combination thereof.

16. The method of claim 15, wherein the method further comprises the GPI device utilizing smart routing to transmit the general purpose signal and/or the command.

17. The method of claim 16, wherein the callback function includes routing data that specifies where the script is to be transmitted.

18. The method of claim 16, wherein the smart routing further comprises optimizing latency for near instantaneous transmission and delivery of the command to the second device when the detecting triggers the callback function to transmit the command to the second device.

19. The method of claim 11, wherein the first device is a broadcast switcher, wherein the second device is a graphics engine, and wherein the command instructs the graphics engine to generate a graphic.

20. The method of claim 11, wherein the second device is a video server, and wherein the command instructs the video server to play a video.

* * * * *